UNITED STATES PATENT OFFICE.

GEORGE R. BARE AND JAMES A. DOUGLASS, OF COLUMBIANA, OHIO.

COMPOSITION AND MANUFACTURE OF BRICK OR ARTIFICIAL STONE.

SPECIFICATION forming part of Letters Patent No. 302,646, dated July 29, 1884.

Application filed March 28, 1884. (Specimens.)

*To all whom it may concern:*

Be it known that we, GEORGE R. BARE and JAMES A. DOUGLASS, of Columbiana, in the county of Columbiana and State of Ohio, have invented certain new and useful Improvements in the Composition and Manufacture of Brick or Artificial Stone; and we do hereby declare the following to be a full, clear, and exact description of the invention, such as will enable others skilled in the art to which it appertains to make and use the same.

Our invention relates to an improvement in the composition and manufacture of brick or artificial stone. Hitherto the compositions for this purpose have required the use of ingredients too numerous, too expensive, or too scarce to compete successfully with the common clay brick in those sections of country where clay and wood are abundant; or they have required the use of substances not commonly found throughout a great part of the West, and transportation has been too expensive to bring them into favor; and, furthermore, there has been a failure to produce brick of perfectly uniform color and hardness, the best pressed brick forming no exception to this. The production of a brick, without the process of burning, similar in appearance, and having the durability of an ordinary burnt clay brick, at a price within the reach of the masses, has been an object sought, but not hitherto fully obtained.

The object of our present invention is to provide brick or artificial stone which shall be more durable than the average burnt brick; a further object being to provide brick or artificial stone which shall have a uniform color of any desired shade; a further object being to provide brick or artificial stone without the use of heat; a further object being to provide brick or artificial stone which shall be perfectly homogeneous, in blocks of any size or shape, and which can be furnished at less cost than the common clay brick.

With these ends in view our invention consists in brick or artificial stone composed of sand, cement, water, and water-slaked lime, with or without asbestus, and a coloring substance, one or both, combined substantially in the following proportions: sand, thirty-six ounces; cement, twelve ounces; water, twenty-four ounces; water-slaked lime, five ounces.

The above-named ingredients are combined in the following manner: First, the sand and cement are mixed in their dry condition; secondly, the water is added and mixed with the sand and cement; thirdly, the water-slaked lime is added, and the whole thoroughly mixed. The mass is then placed in molds of any desired size or shape, and pressed or not.

The amounts above specified will make a brick about eight by four by two, weighing about five pounds.

To make a red brick of any desired shape, red venetian is advantageously employed in the following manner: To make a brick of the ordinary red-brick color and size above noted, mix with the ingredients, sand and cement, taken in the amounts stated, six ounces of red venetian. To give the brick a lighter or deeper shade of red, use less or more of the red venetian, as required. This will give the brick a perfectly uniform color, and is quite inexpensive. Other coloring-matter may be introduced as desired, to form any other color or shade.

For the purpose of rendering our brick fire-proof, we add asbestus in the proportion of about one ounce asbestus to thirty-six ounces of sand, twelve ounces cement, twenty-four ounces water, and five ounces water-slaked lime.

The brick constructed of the ingredients and taken substantially in the proportions specified is ready for use within from twenty-four to forty-eight hours from the time the mixture is placed in the molds.

To render our improved brick water-proof, we first pass them through a hot bath consisting of soap and water, in about the proportions of one and one-half pound soap to two gallons of water; secondly, allowing the bricks to dry; and, thirdly, passing them through an alum bath formed in the proportion of about one-half pound alum to four gallons of water. When dry, the bricks are ready for use. This latter process is of great importance where the brick or artificial stone are to be constantly or a great part of the time exposed to moisture, as the water absorbed by the brick tends, when frozen, to crack off small bits of the surface, thereby defacing it, or, when used for building houses, will render the walls damp.

The advantages of our improved brick consist in their adaptability to all purposes for which brick and stone are at present used—in ornamental fronts, in outside and inside walls of all descriptions, in fence-posts, mantels, and sarcophagi—and the material in its plastic state may be molded into tiles of all descriptions. The materials of which the brick are formed are found, for the most part, abundantly distributed throughout the country, and such ingredients as are not found at hand form a small and inexpensive part of the whole. The rapidity and ease with which they can be made, their uniform color and hardness, and their cheapness and durability cannot but meet the want for building material long felt in many sections of the country, and save the enormous waste of wood, which is at present looked upon as a great evil.

We do not wish to limit ourselves strictly to the proportions named in our composition, nor to the particular named method described of compounding them, as it may be found by further experiment advantageous to slightly alter them without changing the nature of our product.

Having fully described our invention, what we claim as new, and desire to secure by Letters Patent, is—

1. Brick or artificial stone composed, essentially, of sand, cement, water, and water-slaked lime, combined in the proportions substantially as set forth.

2. Brick or artificial stone composed of sand, cement, water, water-slaked lime, and a coloring substance, combined in the proportions substantially as set forth.

3. Brick or artificial stone composed of sand, cement, water, water-slaked lime, and asbestus, combined in the proportions substantially as set forth.

4. Brick or artificial stone composed of sand, cement, water, water-slaked lime, asbestus, and a coloring substance, combined in the proportions substantially as set forth.

5. The process of manufacturing brick or artificial stone, consisting in, first, mixing sand and cement in a dry state, either with or without asbestus and a coloring substance, one or both; secondly, adding water to the mixture and stirring; thirdly, adding water-slaked lime and mixing the whole thoroughly; and, fourthly, molding the plastic mass into the desired size and shape, substantially as set forth.

6. The process of manufacturing water-proof brick or artificial stone, consisting in, first, mixing sand and cement, either with or without asbestus and a coloring substance, one or both; secondly, adding water to the mixture; thirdly, adding water-slaked lime and mixing thoroughly; fourthly, molding the plastic mass; fifthly, passing the brick through a soap bath; and, sixthly, passing the brick, when dry, through an alum bath, substantially as set forth.

In testimony whereof we have signed this specification in the presence of two subscribing witnesses.

GEORGE R. BARE.
J. A. DOUGLASS.

Witnesses:
WILLIAM CULP,
F. A. WITT.